(12) United States Patent
Ward et al.

(10) Patent No.: US 11,775,395 B2
(45) Date of Patent: Oct. 3, 2023

(54) WITHDRAWING A POINT-IN-TIME SNAPSHOT COPY OPERATION WITHIN A DATA CONSISTENCY APPLICATION

(71) Applicant: International Business Machines Corporation, Armonk, NY (US)

(72) Inventors: Matthew J. Ward, Vail, AZ (US); Theresa Mary Brown, Tucson, AZ (US); Nedlaya Yazzie Francisco, Tucson, AZ (US); Gail Spear, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 256 days.

(21) Appl. No.: 16/773,637

(22) Filed: Jan. 27, 2020

(65) Prior Publication Data

US 2021/0232462 A1 Jul. 29, 2021

(51) Int. Cl.
*G06F 11/14* (2006.01)
*G06F 11/30* (2006.01)
*G06F 9/54* (2006.01)

(52) U.S. Cl.
CPC .......... *G06F 11/1461* (2013.01); *G06F 9/542* (2013.01); *G06F 11/1451* (2013.01); *G06F 11/1464* (2013.01); *G06F 11/1469* (2013.01); *G06F 11/3034* (2013.01); *G06F 2201/84* (2013.01)

(58) Field of Classification Search
CPC ............ G06F 11/1461; G06F 11/1469; G06F 11/1451; G06F 11/3034; G06F 9/542; G06F 11/1464; G06F 2201/84

USPC ........................................................ 711/162
See application file for complete search history.

(56) References Cited

U.S. PATENT DOCUMENTS

| 7,363,445 | B2 | 4/2008 | Yoshinari |
| 7,571,293 | B1 | 8/2009 | LeCrone et al. |
| 8,156,080 | B2 | 4/2012 | Beck |
| 8,880,472 | B2 | 11/2014 | Ponsford |
| 9,846,555 | B2 | 12/2017 | Inoue et al. |

(Continued)

FOREIGN PATENT DOCUMENTS

EP 2424186 A1 2/2012

OTHER PUBLICATIONS

Anonymous, "NIST Cloud Computing Program," NIST, Information Technology Laboratory, Nov. 13, 2013, pp. 1-2, retrieved from www.nist.gov/itl/cloud/.

(Continued)

*Primary Examiner* — Gautam Sain
*Assistant Examiner* — Wei Ma
(74) *Attorney, Agent, or Firm* — Zilka-Kotab, P.C.

(57) ABSTRACT

A computer-implemented method according to one embodiment includes receiving a request to withdraw a point-in-time snapshot copy operation being implemented by a data consistency application; in response to determining that the data consistency application is creating a current consistency group, maintaining the withdrawal request while allowing the creation of the current consistency group by the data consistency application; and in response to determining that the data consistency application is idle, preventing a formation of a new consistency group by the data consistency application during the withdrawal of the point-in-time snapshot copy operation.

19 Claims, 8 Drawing Sheets

(56) References Cited

U.S. PATENT DOCUMENTS

| | | | | |
|---|---|---|---|---|
| 2005/0071710 A1* | 3/2005 | Micka | ............... | G06F 11/2058 |
| | | | | 714/6.12 |
| 2006/0112244 A1* | 5/2006 | Buah | ............... | G06F 11/2069 |
| | | | | 711/162 |
| 2007/0033361 A1 | 2/2007 | Abdulvahid et al. | | |
| 2007/0130213 A1* | 6/2007 | Jean-Denis | ......... | G06F 11/2066 |
| 2014/0344539 A1* | 11/2014 | Gordon | ............... | G06F 16/128 |
| | | | | 711/162 |
| 2015/0237133 A1* | 8/2015 | Clayton | ............... | H04L 67/16 |
| | | | | 709/219 |
| 2017/0293519 A1* | 10/2017 | Herz | ............... | G06F 11/3495 |
| 2018/0157421 A1* | 6/2018 | Brown | ............... | G06F 11/2074 |
| 2018/0157423 A1* | 6/2018 | Brown | ............... | G06F 3/0646 |
| 2018/0321848 A1* | 11/2018 | Brown | ............... | G06F 11/1402 |
| 2018/0349042 A1* | 12/2018 | Brown | ............... | G06F 3/067 |

OTHER PUBLICATIONS

Mell et al., "The NIST Definition of Cloud Computing," Version 15, Oct. 7, 2009, pp. 1-2.

Mell et al., "The NIST Definition of Cloud Computing," Recommendations of the National Institute of Standards and Technology, NIST Special Publication 800-145, Sep. 2011, pp. 1-7.

CSRC, "Cloud Computing," Computer Security Resource Center, Oct. 2017, 3 pages, retrieved from https://csrc.nist.gov/projects/cloud-computing.

\* cited by examiner

WITHDRAWING A POINT-IN-TIME SNAPSHOT COPY OPERATION WITHIN A DATA CONSISTENCY APPLICATION

BACKGROUND

The present invention relates to data replication, and more particularly, this invention relates to withdrawing a point-in-time snapshot copy operation within a data replication environment.

Data replication is a popular way of securing important data to provide protection against system outages. Performing a point-in-time snapshot copy of data also preserves a current state of data within a system. However, an application may wish to withdraw a point-in-time snapshot copy of data that is currently being performed during data replication, without negatively affecting a performance or a recovery point objective (RPO) of a system in which the data replication is implemented.

BRIEF SUMMARY

A computer-implemented method according to one embodiment includes receiving a request to withdraw a point-in-time snapshot copy operation being implemented by a data consistency application; in response to determining that the data consistency application is creating a current consistency group, maintaining the withdrawal request while allowing the creation of the current consistency group by the data consistency application; and in response to determining that the data consistency application is idle, preventing a formation of a new consistency group by the data consistency application during the withdrawal of the point-in-time snapshot copy operation.

According to another embodiment, a computer program product for withdrawing a point-in-time snapshot copy operation within a data consistency application includes a computer readable storage medium having program instructions embodied therewith, where the computer readable storage medium is not a transitory signal per se, and where the program instructions are executable by a processor to cause the processor to perform a method including receiving, by the processor, a request to withdraw a point-in-time snapshot copy operation being implemented by a data consistency application; in response to determining that the data consistency application is creating a current consistency group, maintaining, by the processor, the withdrawal request while allowing the creation of the current consistency group by the data consistency application; and in response to determining that the data consistency application is idle, preventing, by the processor, a formation of a new consistency group by the data consistency application during the withdrawal of the point-in-time snapshot copy operation.

According to another embodiment, a system includes a processor; and logic integrated with the processor, executable by the processor, or integrated with and executable by the processor, where the logic is configured to receive a request to withdraw a point-in-time snapshot copy operation being implemented by a data consistency application; in response to determining that the data consistency application is creating a current consistency group, maintain the withdrawal request while allowing the creation of the current consistency group by the data consistency application; and in response to determining that the data consistency application is idle, prevent a formation of a new consistency group by the data consistency application during the withdrawal of the point-in-time snapshot copy operation.

Other aspects and embodiments of the present invention will become apparent from the following detailed description, which, when taken in conjunction with the drawings, illustrate by way of example the principles of the invention.

DETAILED DESCRIPTION

Figure 1:
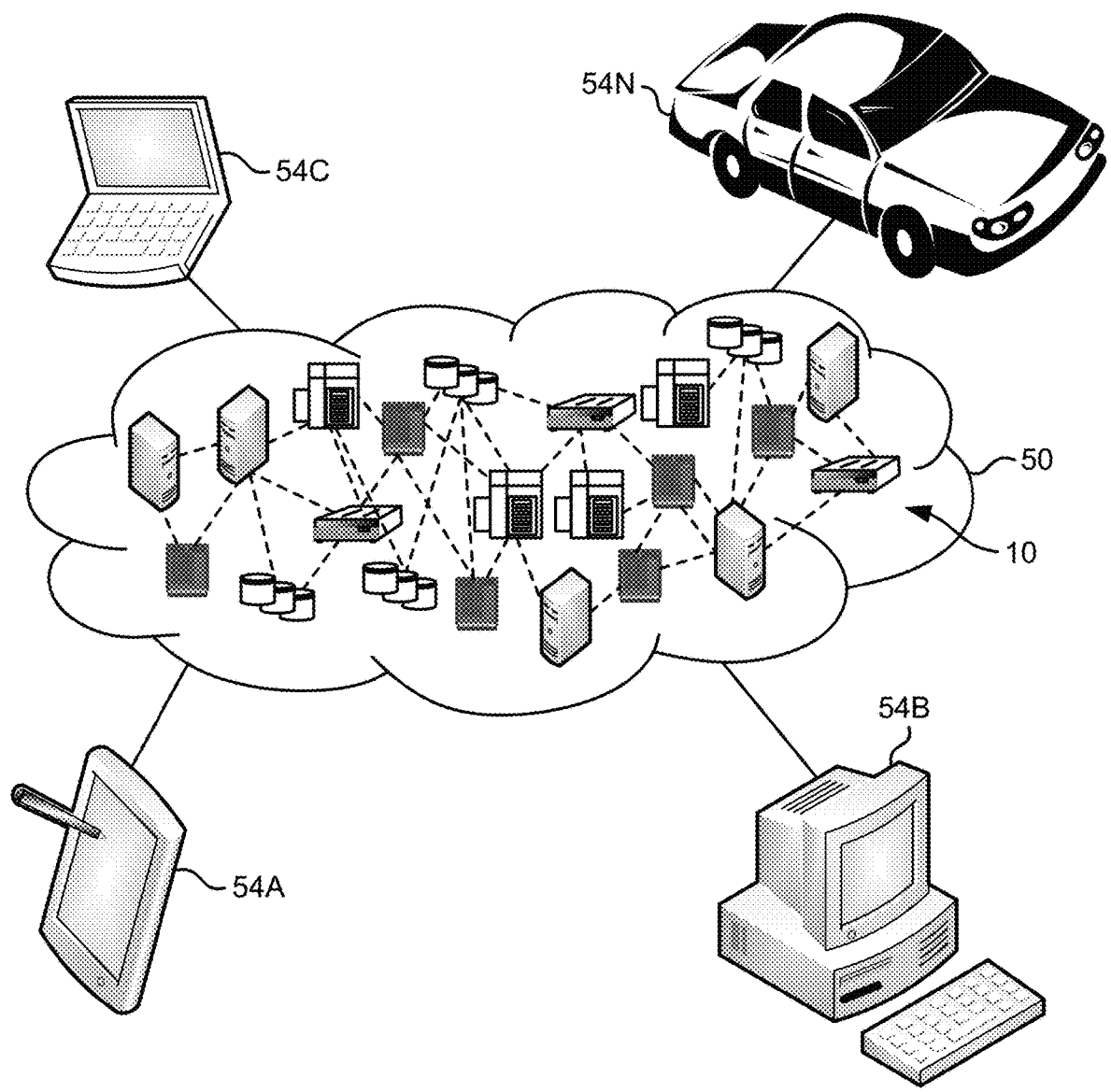
FIG. 1 depicts a cloud computing environment in accordance with one embodiment of the present invention.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several embodiments of withdrawing a point-in-time snapshot copy operation within a data consistency application.

In one general embodiment, a computer-implemented method includes receiving a request to withdraw a point-in-time snapshot copy operation being implemented by a data consistency application; in response to determining that the data consistency application is creating a current consistency group, maintaining the withdrawal request while allowing the creation of the current consistency group by the data consistency application; and in response to determining that the data consistency application is idle, preventing a formation of a new consistency group by the data consistency application during the withdrawal of the point-in-time snapshot copy operation.

In another general embodiment, a computer program product for withdrawing a point-in-time snapshot copy operation within a data consistency application includes a computer readable storage medium having program instructions embodied therewith, where the computer readable storage medium is not a transitory signal per se, and where the program instructions are executable by a processor to cause the processor to perform a method including receiving, by the processor, a request to withdraw a point-in-time snapshot copy operation being implemented by a data consistency application; in response to determining that the data consistency application is creating a current consistency group, maintaining, by the processor, the withdrawal request while allowing the creation of the current consistency group by the data consistency application; and in response to determining that the data consistency application is idle, preventing, by the processor, a formation of a new consistency group by the data consistency application during the withdrawal of the point-in-time snapshot copy operation.

In another general embodiment, a system includes a processor; and logic integrated with the processor, executable by the processor, or integrated with and executable by the processor, where the logic is configured to receive a request to withdraw a point-in-time snapshot copy operation being implemented by a data consistency application; in response to determining that the data consistency application is creating a current consistency group, maintain the withdrawal request while allowing the creation of the current consistency group by the data consistency application; and in response to determining that the data consistency application is idle, prevent a formation of a new consistency group by the data consistency application during the withdrawal of the point-in-time snapshot copy operation.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
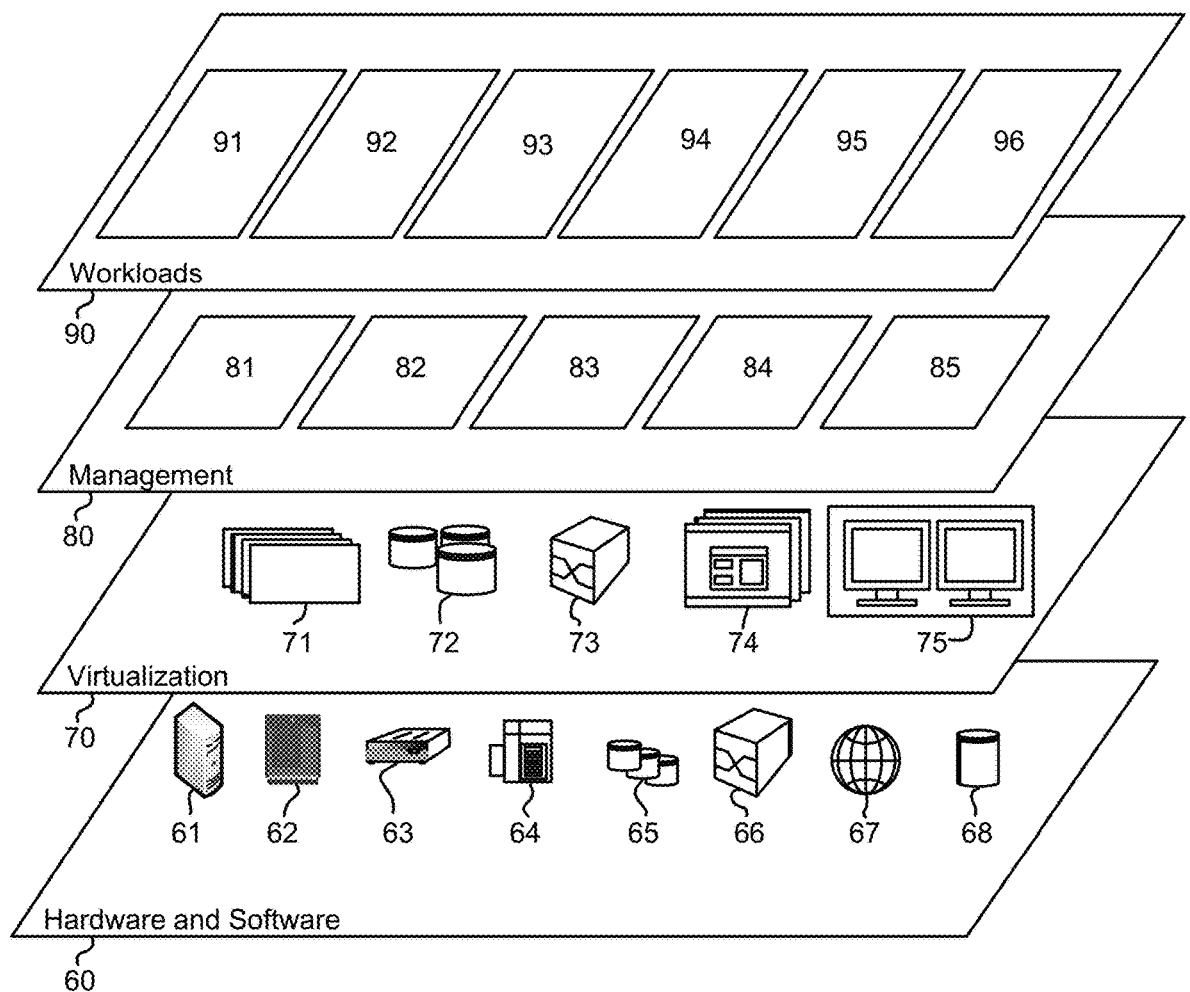
FIG. 2 depicts abstraction model layers in accordance with one embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and data consistency implementation 96.

Figure 3:
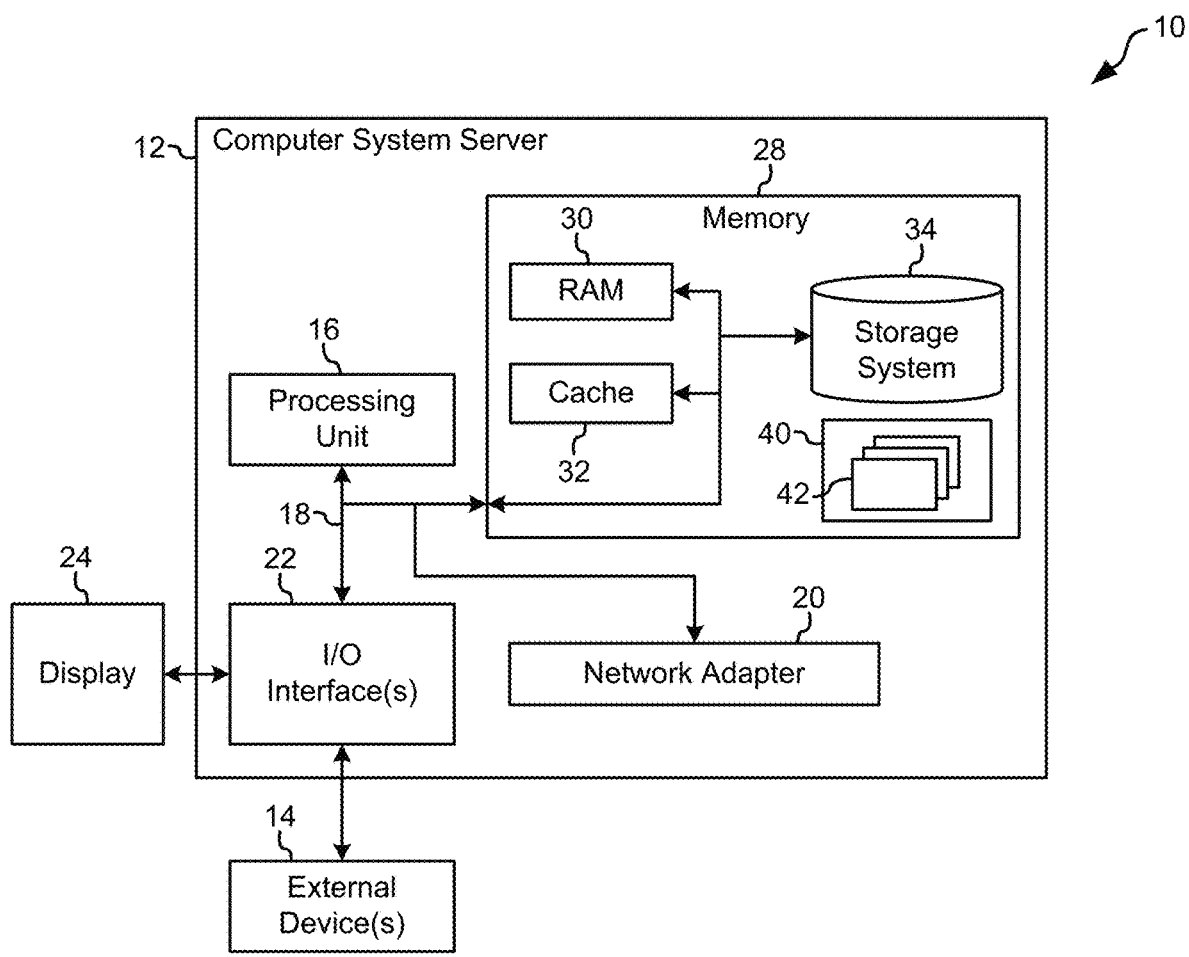
FIG. 3 depicts a cloud computing node in accordance with one embodiment of the present invention.

Referring now to FIG. 3, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 3, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 4:
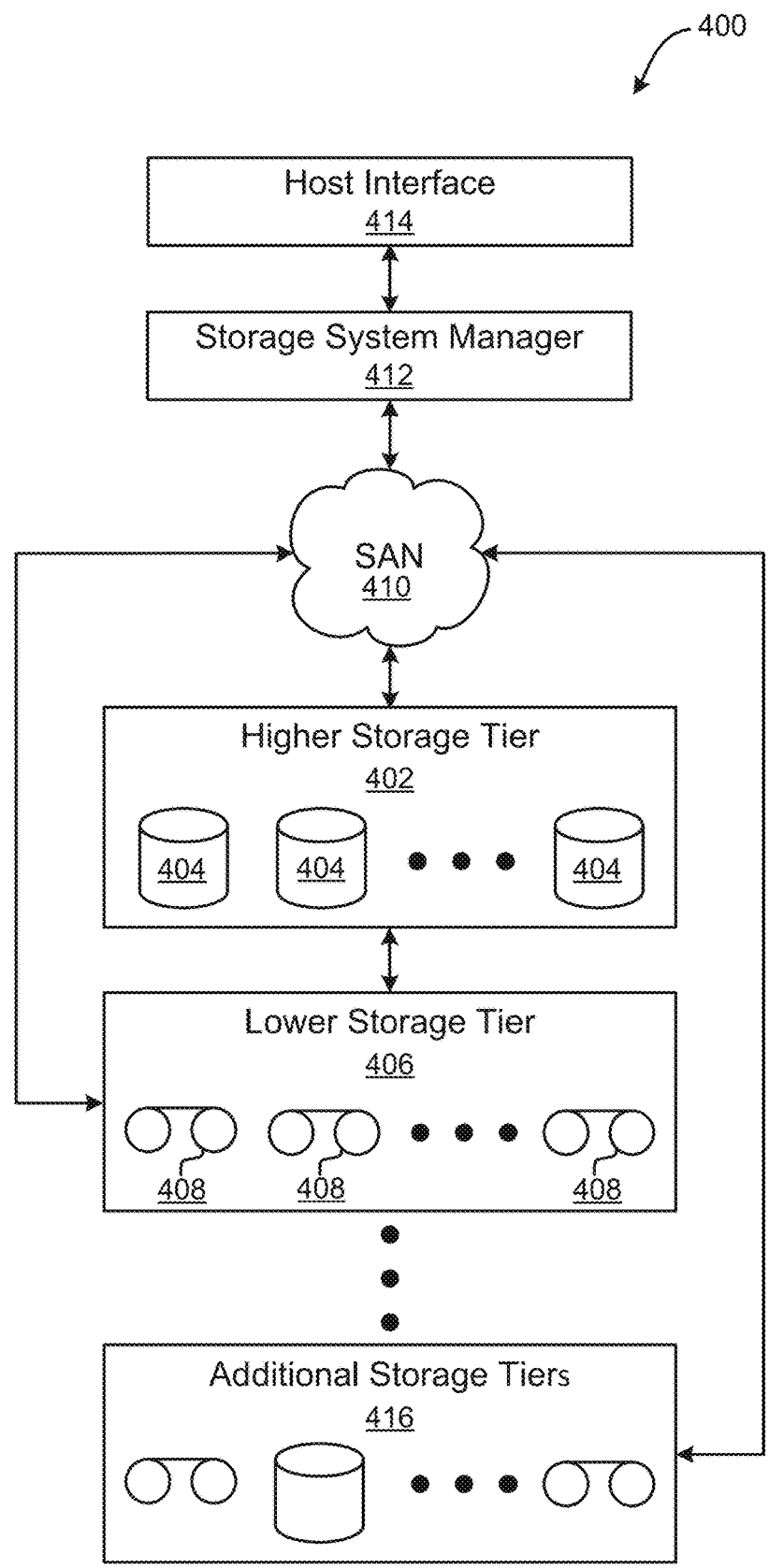
FIG. 4 illustrates a tiered data storage system in accordance with one embodiment of the present invention.

Now referring to FIG. 4, a storage system 400 is shown according to one embodiment. Note that some of the elements shown in FIG. 4 may be implemented as hardware and/or software, according to various embodiments. The storage system 400 may include a storage system manager 412 for communicating with a plurality of media on at least one higher storage tier 402 and at least one lower storage tier 406. The higher storage tier(s) 402 preferably may include one or more random access and/or direct access media 404, such as hard disks in hard disk drives (HDDs), nonvolatile memory (NVM), solid state memory in solid state drives (SSDs), flash memory, SSD arrays, flash memory arrays, etc., and/or others noted herein or known in the art. The lower storage tier(s) 406 may preferably include one or more lower performing storage media 408, including sequential access media such as magnetic tape in tape drives and/or optical media, slower accessing HDDs, slower accessing SSDs, etc., and/or others noted herein or known in the art. One or more additional storage tiers 416 may include any combination of storage memory media as desired by a designer of the system 400. Also, any of the higher storage tiers 402 and/or the lower storage tiers 406 may include some combination of storage devices and/or storage media.

The storage system manager 412 may communicate with the storage media 404, 408 on the higher storage tier(s) 402 and lower storage tier(s) 406 through a network 410, such as a storage area network (SAN), as shown in FIG. 4, or some other suitable network type. The storage system manager 412 may also communicate with one or more host systems (not shown) through a host interface 414, which may or may not be a part of the storage system manager 412. The storage system manager 412 and/or any other component of the storage system 400 may be implemented in hardware and/or software, and may make use of a processor (not shown) for executing commands of a type known in the art, such as a central processing unit (CPU), a field programmable gate array (FPGA), an application specific integrated circuit (ASIC), etc. Of course, any arrangement of a storage system may be used, as will be apparent to those of skill in the art upon reading the present description.

In more embodiments, the storage system 400 may include any number of data storage tiers, and may include the same or different storage memory media within each storage tier. For example, each data storage tier may include the same type of storage memory media, such as HDDs, SSDs, sequential access media (tape in tape drives, optical disk in optical disk drives, etc.), direct access media (CD-ROM, DVD-ROM, etc.), or any combination of media storage types. In one such configuration, a higher storage tier 402, may include a majority of SSD storage media for storing data in a higher performing storage environment, and remaining storage tiers, including lower storage tier 406 and additional storage tiers 416 may include any combination of SSDs, HDDs, tape drives, etc., for storing data in a lower performing storage environment. In this way, more frequently accessed data, data having a higher priority, data needing to be accessed more quickly, etc., may be stored to the higher storage tier 402, while data not having one of these attributes may be stored to the additional storage tiers 416, including lower storage tier 406. Of course, one of skill in the art, upon reading the present descriptions, may devise many other combinations of storage media types to implement into different storage schemes, according to the embodiments presented herein.

According to some embodiments, the storage system (such as 400) may include logic configured to receive a request to open a data set, logic configured to determine if the requested data set is stored to a lower storage tier 406 of a tiered data storage system 400 in multiple associated portions, logic configured to move each associated portion of the requested data set to a higher storage tier 402 of the tiered data storage system 400, and logic configured to assemble the requested data set on the higher storage tier 402 of the tiered data storage system 400 from the associated portions.

Of course, this logic may be implemented as a method on any device and/or system or as a computer program product, according to various embodiments.

Figure 5:
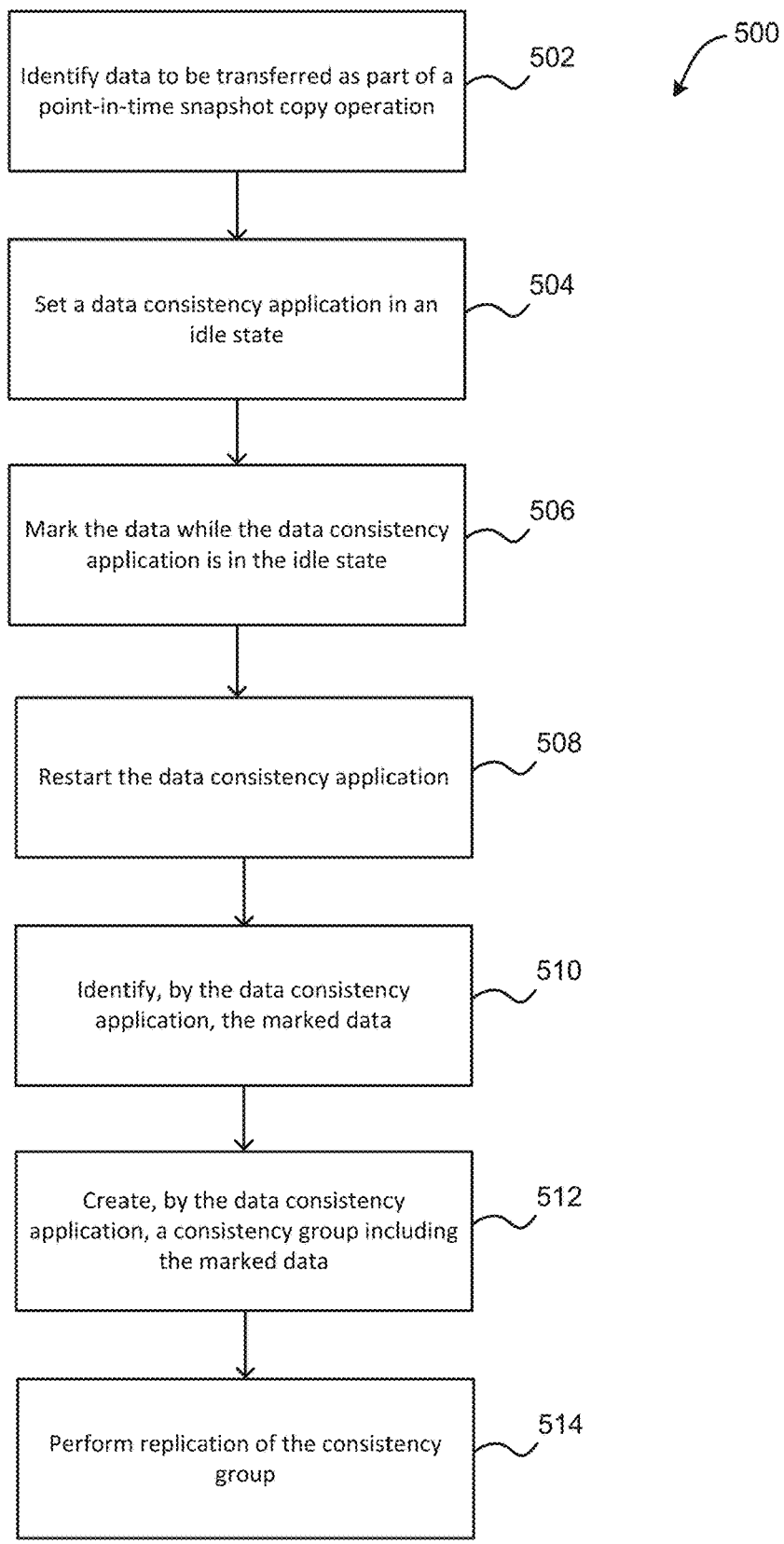
FIG. 5 illustrates a flowchart of a method for performing a point-in-time snapshot copy operation within a data consistency application, in accordance with one embodiment of the present invention.

Now referring to FIG. 5, a flowchart of a method 500 is shown according to one embodiment. The method 500 may be performed in accordance with the present invention in any of the environments depicted in FIGS. 1-4 and 6, among others, in various embodiments. Of course, more or less operations than those specifically described in FIG. 5 may be included in method 500, as would be understood by one of skill in the art upon reading the present descriptions.

Each of the steps of the method 500 may be performed by any suitable component of the operating environment. For example, in various embodiments, the method 500 may be partially or entirely performed by one or more servers, computers, or some other device having one or more processors therein. The processor, e.g., processing circuit(s), chip(s), and/or module(s) implemented in hardware and/or software, and preferably having at least one hardware component may be utilized in any device to perform one or more steps of the method 500. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 5, method 500 may initiate with operation 502, where data to be transferred as part of a point-in-time snapshot copy operation is identified. In one embodiment, the point-in-time snapshot copy operation may include the transfer of a point-in-time copy of the data from a first logical storage volume (e.g., a source volume) to a second logical storage volume (e.g., a target volume). For example, in response to one or more changes made to data within a source volume, specific portions of the data affected by the changes may be identified. In another example, the specific portions of the data may be included within the data to be transferred as part of the point-in-time snapshot copy operation.

Additionally, in one embodiment, the point-in-time snapshot copy operation may include an IBM® FlashCopy operation. In another embodiment, a logical storage volume may include virtualized representation of physical storage from one or more physical storage volumes. For example, the first logical storage volume may represent first physical storage located at a first site (e.g., physical storage environment location).

Further, in one embodiment, the first site may include a plurality of logical partitions (LPARs). For example, each LPAR may include computing hardware (e.g., one or more processors, etc.). In another example, each LPAR may include storage hardware (e.g., physical storage drives such as hard disk drives, flash drives, tape drives, etc.). In yet another example, the storage hardware may provide the physical storage resources for the logical storage volume. In still another example, an exemplary LPAR may include an IBM® DS8000® series server.

Further still, in one embodiment, the second logical storage volume may represent second physical storage located at a second site separate from the first site. In another embodiment, the data may include one or more tracks of a logical storage volume, an entire logical storage volume, a predetermined data set, etc.

Also, method 500 may proceed with operation 504, where a data consistency application is set in an idle state. In one embodiment, a global copy application may perform asynchronous data replication between a first logical storage volume (e.g., a source volume) located at a first site and a second logical storage volume (e.g., a target volume) located at a second site. In another embodiment, the asynchronous data replication may include identifying changes made to data at a first site, and implementing those changes to data at a second site.

In addition, in one embodiment, the asynchronous data replication may be performed to create a backup volume to protect against hardware failure, malware, etc. In another embodiment, the data consistency application may maintain data consistency during asynchronous data replication by ensuring a predetermined order of data being replicated. For example, the global copy application may not guarantee consistency (e.g., an order in which the data is being sent during asynchronous data replication).

Furthermore, in one embodiment, the data consistency application may include an instance of IBM® Global Mirror. In another embodiment, the data consistency application may have two states. For example, a first state of the data consistency application may include an active state in which the data consistency application is currently forming a consistency group (e.g., a group of data to be sent during data replication). In another example, a second state of the data consistency application may include an idle state in which the data consistency application does not form a consistency group.

Further still, in one embodiment, the data consistency application may be set in an idle state by sending one or more commands to the data consistency application (e.g., an idle state initiation command, etc.). In another embodiment, by setting the data consistency application in the idle state, the data consistency application may be temporarily prevented from creating a consistency group.

Also, method 500 may proceed with operation 506, where the data is marked while the data consistency application is in the idle state. In one embodiment, the data may be marked as data to be replicated during asynchronous data replication. In another embodiment, the data may be marked by setting an out of sync bit map for a global copy relationship for the data. In yet another embodiment, the data consistency application may be maintained in the idle state while the data is marked (e.g., by periodically sending one or more idle commands, etc.).

Additionally, method 500 may proceed with operation 508, where the data consistency application is restarted. In one embodiment, the data consistency application may be restarted by changing the state of the data consistency application. In another embodiment, the data consistency application may be set in an active state by sending one or more commands to the data consistency application (e.g., an active state initiation command, etc.).

Further, method 500 may proceed with operation 510, where the marked data is identified by the data consistency application. In one embodiment, while in the active state, the data consistency application may identify the out of sync bit map for a global copy relationship set for the data. In another embodiment, in response to the identification, the data consistency application may identify the marked data as data located at a first site that is not synchronized with a second site.

Further still, method 500 may proceed with operation 512, where a consistency group including the marked data is created by the data consistency application. In one embodiment, in response to the identification of the marked data, the data consistency application may create a data consistency group that includes the marked data. In another embodiment, the data consistency application may create a data consistency group in response to a request received from a master process at a subordinate process.

Also, in one embodiment, the data consistency group may include data in addition to the data to be transferred as part of a point-in-time snapshot copy operation. In another embodiment, creating the consistency group may include tagging the marked data (e.g., using one or more flags) as data to be synchronized with a second site. In yet another embodiment, the consistency group may be created by a subordinate process within one or more servers of the first site.

In addition, method 500 may proceed with operation 514, where replication of the consistency group is performed. In one embodiment, performing replication of the consistency group may include sending data within the consistency group from a first site to a second site for integration at the second site. For example, the marked data within the consistency group may be sent from a first site (where changes were made to data within a source volume of the first site) to replace corresponding data at a second site (where a target volume of the second site stores a mirrored copy of all data within the source volume of the first site).

In this way, a point-in-time snapshot copy operation may be performed while maintaining data consistency between the first site and the second site during data replication. As a result, data at the second site may be used to restore data at the first site in response to one or more events (e.g., hardware or software failure at the first site, malware at the first site, etc.). This may protect data stored within the first site, and may improve a performance of hardware at the first site in response to one or more failures.

Figure 6:
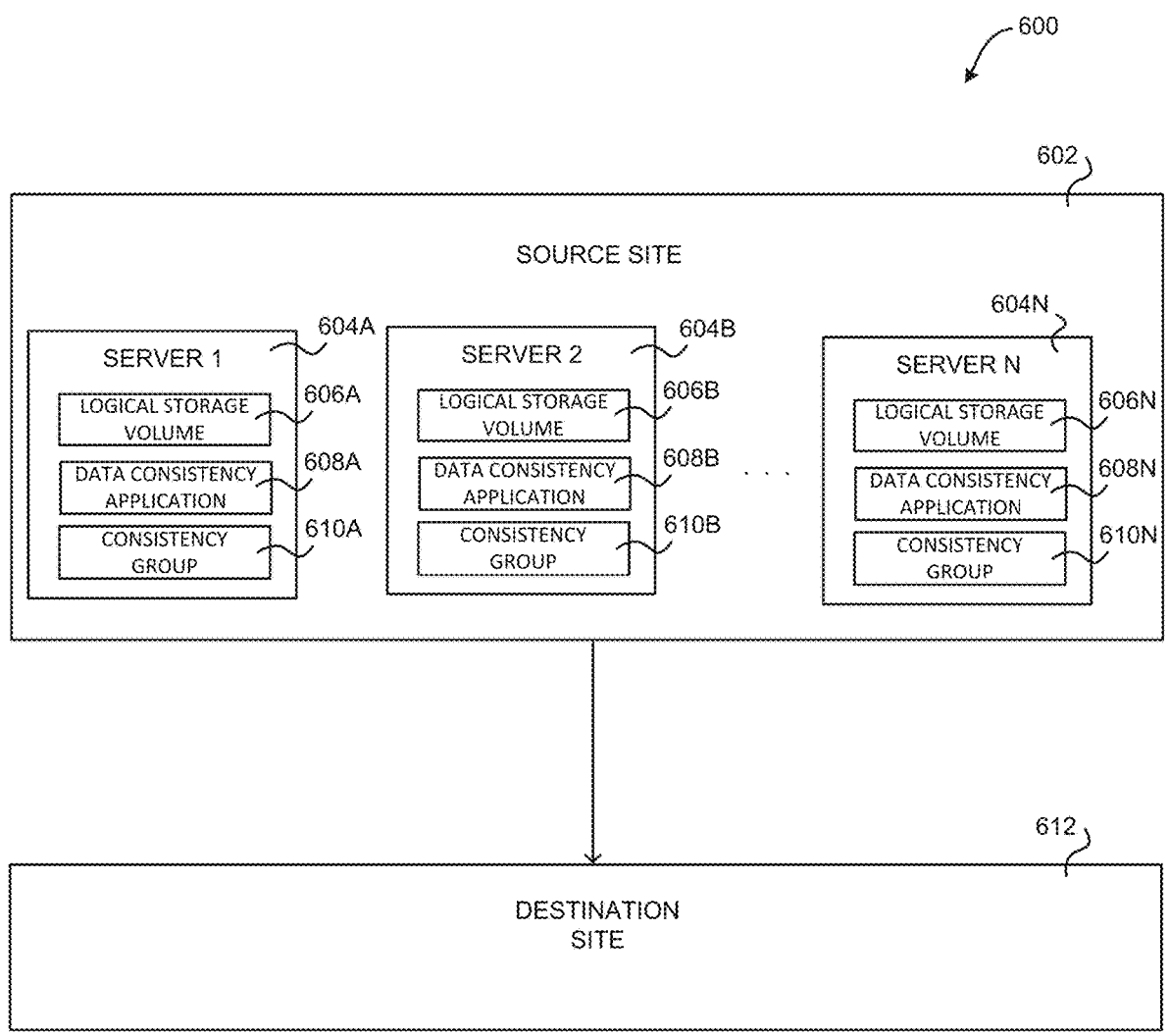
FIG. 6 illustrates an exemplary environment for performing a point-in-time snapshot copy operation within a data consistency application, in accordance with one embodiment of the present invention.

FIG. 6 illustrates an exemplary environment 600 for performing a point-in-time snapshot copy operation within a data consistency application, according to one embodiment. As shown, a source site 602 includes a plurality of servers 604A-N. Each of the plurality of plurality of servers 604A-N may be a logical partition (LPAR). Each of the plurality of servers 604A-N includes a logical storage volume 606A-N. In one embodiment, each of the plurality of servers 604A-N includes multiple logical storage volumes.

Additionally, in one embodiment, a request to perform point-in-time snapshot copy operation may be received at each of the plurality of servers 604A-N. In response to receiving the request, a data consistency application 608A-N is set to an idle state within each of the plurality of servers 604A-N. Additionally, data within the logical storage volumes 606A-N of the plurality of servers 604A-N that is to be transferred during the point-in-time snapshot copy operation is marked within each of the plurality of servers 604A-N (e.g., utilizing an out of sync bit map for a global copy relationship within each of the plurality of servers 604A-N, etc.)

Further, in one embodiment, after the data has been marked, the data consistency application 608A-N within each of the plurality of servers 604A-N is restarted. In response, each data consistency application 608A-N identifies the marked data within its corresponding logical storage volumes 606A-N and creates a corresponding consistency group 610A-N that includes the marked data.

Further still, in one embodiment, the data within each of the consistency groups 610A-N is then sent from the source site 602 to a destination site 612. For example, the destination site 612 may include one or more target storage volumes that receive and store the data within each of the consistency groups 610A-N as part of a replication operation.

Figure 7:
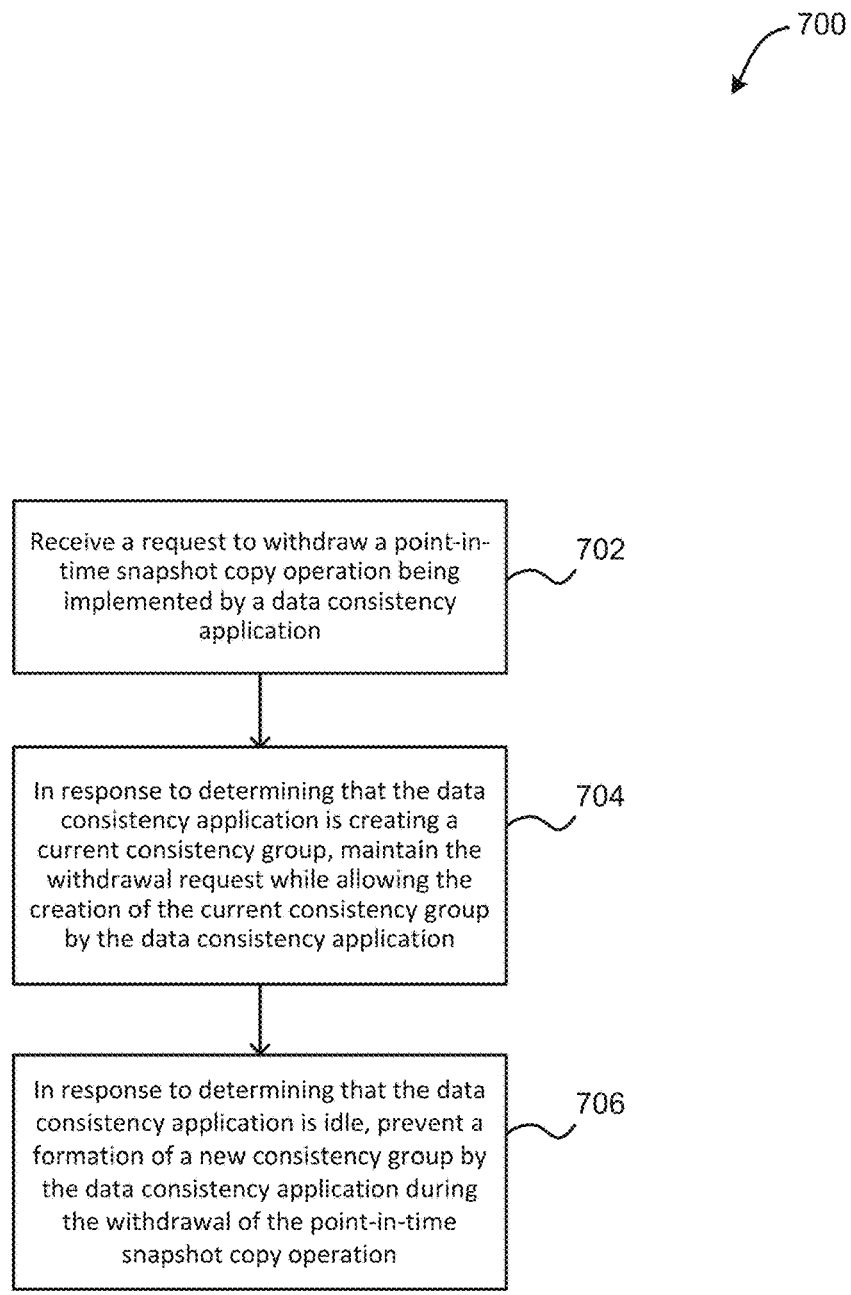
FIG. 7 illustrates a flowchart of a method for withdrawing a point-in-time snapshot copy operation within a data consistency application, in accordance with one embodiment of the present invention.

Now referring to FIG. 7, a flowchart of a method 700 is shown according to one embodiment. The method 700 may be performed in accordance with the present invention in any of the environments depicted in FIGS. 1-4 and 6, among others, in various embodiments. Of course, more or less operations than those specifically described in FIG. 7 may be included in method 700, as would be understood by one of skill in the art upon reading the present descriptions.

Each of the steps of the method 700 may be performed by any suitable component of the operating environment. For example, in various embodiments, the method 700 may be partially or entirely performed by one or more servers, computers, or some other device having one or more processors therein. The processor, e.g., processing circuit(s), chip(s), and/or module(s) implemented in hardware and/or software, and preferably having at least one hardware component may be utilized in any device to perform one or more steps of the method 700. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 7, method 700 may initiate with operation 702, where a request to withdraw a point-in-time snapshot copy operation being implemented by a data consistency application is received. In one embodiment, the point-in-time snapshot copy operation may include the transfer of a point-in-time copy of data from a first logical storage volume (e.g., a source volume) to a second logical storage volume (e.g., a target volume) within a system. In another embodiment, the point-in-time snapshot copy operation may include an IBM® FlashCopy operation.

Additionally, in one embodiment, the data may include one or more tracks of a logical storage volume, an entire logical storage volume, a predetermined data set, etc. In another embodiment, the point-in-time snapshot copy operation may be implemented by identifying data to be transferred as part of the point-in-time snapshot copy operation, setting a data consistency application in an idle state, marking the data while the data consistency application is in the idle state, restarting the data consistency application, creating, by the data consistency application, a consistency group including the marked data, and performing replication of the consistency group.

Further, in one embodiment, the request to withdraw the point-in-time snapshot copy operation may be received from an application that sent the request to implement the point-in-time snapshot copy operation. For example, the application may not need the point-in-time snapshot, and may request its removal from the system.

Further still, in one embodiment, the data consistency application may currently be implementing the point-in-time snapshot copy operation when the withdrawal request is received. For example, the data consistency application may be creating the consistency group and/or performing replication of the consistency group when the withdrawal request is received.

Also, method 700 may proceed with operation 704, where in response to determining that the data consistency application is creating a current consistency group, the withdrawal request is maintained while allowing the creation of the current consistency group by the data consistency application. In one embodiment, a consistency group in progress (CGIP) event may be identified upon determining that the data consistency application is creating the current consistency group. For example, the current consistency group may include data to be transferred as part of the point-in-time snapshot copy operation.

In addition, in one embodiment, a callback flag may be set upon determining that the data consistency application is creating the current consistency group. For example, the callback flag may indicate that the withdrawal request is pending during the creation of the current consistency group. In another example, the callback flag may indicate that the withdrawal is to be performed after the creation and replication of the current consistency group.

In yet another example, the callback flag may be implemented at a device level within the system. In still another example, the callback flag may be include a withdraw pending flag that includes a sub-volume indicator (e.g., a range of tracks, etc.).

Furthermore, method 700 may proceed with operation 706, where in response to determining that the data consistency application is idle, a formation of a new consistency group by the data consistency application is prevented during the withdrawal of the point-in-time snapshot copy operation. In one embodiment, the data consistency application may be determined to be idle in response to determining that the data consistency application is not currently creating or replicating a consistency group when the withdrawal request is received.

Further still, in one embodiment, the formation of a new consistency group may be prevented by setting an idle flag. For example, the idle flag may be set in response to determining that the data consistency application was idle when the request to withdraw the point-in-time snapshot copy operation was received. In another example, the idle flag may indicate that the data consistency application may not create a new consistency group while the flag is set (e.g., while the point-in-time snapshot copy operation is being withdrawn, etc.).

Also, in one example, the idle flag may be implemented at a device level. In still another example, the idle flag may be include a withdraw pending flag that includes a sub-volume indicator (e.g., a range of tracks, etc.).

Additionally, in one embodiment, the formation of a new consistency group may be prevented by setting a CGIP flag. For example, the COP flag may be reset in response to determining that (i) the data consistency application was creating a current consistency group when the request to withdraw the point-in-time snapshot copy operation was received, and (ii) the data consistency application has completed the creation and replication of a current consistency group (or has failed and is now idle). In another example, the CGIP flag may be set in response to identifying that the callback flag is set within the system, and the data consistency application has completed the creation and replication of a current consistency group (or has failed and is idle).

Further, in one example, the callback flag may be reset in response to setting the CGIP flag. In another example, the CGIP flag may indicate that the data consistency application may not create a new consistency group while the flag is set (e.g., while the point-in-time snapshot copy operation is being withdrawn, etc.). In yet another example, the CGIP flag may be implemented at a device level. In still another example, the COP flag may be include a withdraw pending flag that includes a sub-volume indicator (e.g., a range of tracks, etc.).

Further still, in one embodiment, while the idle flag or the CGIP flag is set, the point-in-time snapshot copy operation may be withdrawn. For example, withdrawing the point-in-time snapshot copy operation may include removing the marking or designation of the data that is part of the point-in-time snapshot copy operation. In another example, the marked data may be removed from the target volume. In still another example, the marked data may be removed from the consistency group replicated to the target volume. In yet another example, withdrawing the point-in-time snapshot copy operation may include issuing a call back for every created point-in-time snapshot copy created during the point-in-time snapshot copy operation.

Also, in one embodiment, formation of a new consistency group may be enabled after the withdrawal of the point-in-time snapshot copy operation. For example, the set idle flag or CGIP flag may be reset, thereby enabling the data consistency application to continue creating/forming new consistency groups. In another embodiment, the data consistency application may create another new consistency group in response to determining that neither the idle flag nor the COP flag are set. In yet another embodiment, the data consistency application may create another new consistency group in response to determining that the withdraw pending flag is not set.

In this way, a point-in-time snapshot copy operation may be withdrawn without interrupting the creation and replication of a consistency group by the data consistency application. This may maintain consistency between a source volume and a target volume. This may also prevent withdrawal operations from interrupting the creation and transfer of the consistency group. This may minimize an amount of data that is lost in response to one or more events at the first site (e.g., hardware or software failure at the first site, malware at the first site, etc.). For example, data at the second site may be used to restore data at the first site in response to the one or more events at the first site. This may protect data stored within the first site, and may improve a performance of hardware at the first site in response to one or more failures.

Figure 8:
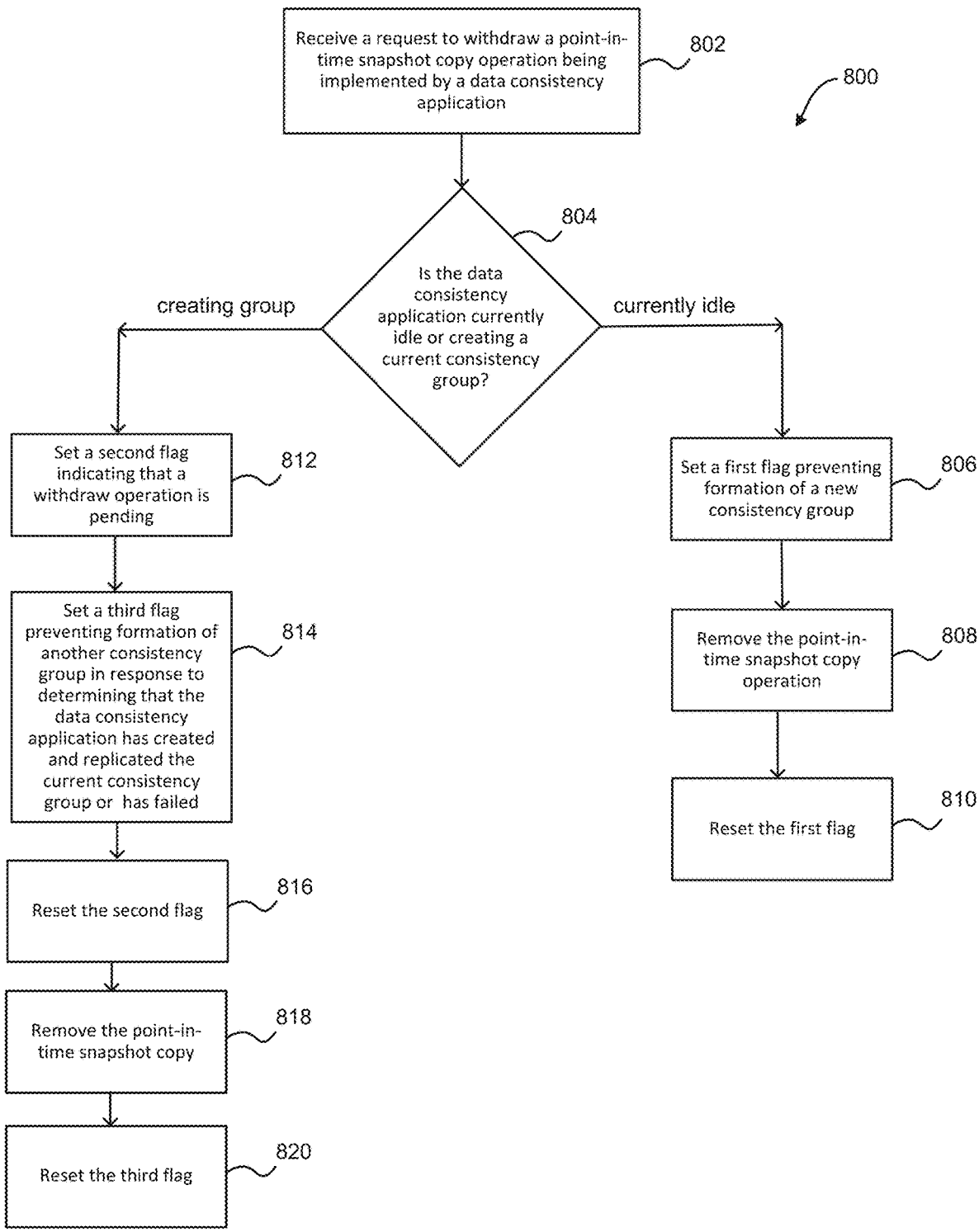
FIG. 8 illustrates a flowchart of a method for withdrawing a point-in-time snapshot copy operation, in accordance with one embodiment of the present invention.

Now referring to FIG. 8, a flowchart of a method 800 for withdrawing a point-in-time snapshot copy operation is shown according to one embodiment. The method 800 may be performed in accordance with the present invention in any of the environments depicted in FIGS. 1-4 and 6, among others, in various embodiments. Of course, more or less operations than those specifically described in FIG. 8 may be included in method 800, as would be understood by one of skill in the art upon reading the present descriptions.

Each of the steps of the method 800 may be performed by any suitable component of the operating environment. For example, in various embodiments, the method 700 may be partially or entirely performed by one or more servers, computers, or some other device having one or more processors therein. The processor, e.g., processing circuit(s), chip(s), and/or module(s) implemented in hardware and/or software, and preferably having at least one hardware component may be utilized in any device to perform one or more steps of the method 700. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 8, method 800 may initiate with operation 802, where a request to withdraw a point-in-time snapshot copy operation being implemented by a data consistency application is received. Additionally, method 800 may proceed with decision 804, where it is determined whether the data consistency application is currently idle or is creating a current consistency group. In response to determining in decision 804 that the data consistency application is currently idle, method 800 may proceed with decision 806, where a first flag preventing formation of a new consistency group is set. Additionally, method 800 may proceed with decision 808, where the point-in-time snapshot copy operation is removed. Further, method 800 may proceed with decision 810, where the first flag is reset.

In one embodiment, the first flag may include an idle withdraw flag preventing the data consistency application from creating a new consistency group. In another embodiment, the data consistency application may proceed with the creation of another consistency group after the first flag is reset.

Additionally, in response to determining in decision 804 that the data consistency application is creating a current consistency group, method 800 may proceed with decision 812, where a second flag is set that indicates that a withdraw operation is pending. Further, method 800 may proceed with decision 814, where in response to determining that the data consistency application has (i) created and replicated the current consistency group or (ii) has failed, a third flag preventing formation of another consistency group is set.

Further still, method 800 may proceed with decision 816, where the second flag is reset. Also, method 800 may proceed with decision 818, where the point-in-time snapshot copy is removed. Additionally, method 800 may proceed with decision 820, where the third flag is reset.

In one embodiment, the second flag may include a callback point-in-time snapshot copy flag that initiates a call to the point-in-time snapshot copy to complete the withdrawal when the current consistency group is completed and replicated (or when the current consistency group has failed). In another embodiment, the third flag may include a CGIP withdraw flag. In yet another embodiment, the data consistency application may proceed with the creation of another consistency group in response to the resetting of the third flag.

In this way, a withdrawal of a point-in-time snapshot copy operation may be dynamically managed based on a current state of the data consistency application when the withdrawal request is received.

Implementing Flash Copy within Global Mirror via Pause and Hold

Performing a flash copy onto a global mirror is challenging in that the point in time copy must not affect the consistency of the global mirror. In one embodiment, a flash copy may be allowed onto a global mirror by putting the global mirror (GM) into an idle state, keeping the GM in the idle state, and setting an out of sync (00S) bitmap for the global copy relationship that represents the data being copied from the flash copy. The data associated with the flash copy will then be transferred over the GM PPRC links. This will result in correct data in the next GM consistency group (CG).

In order to perform a flash copy onto a GM primary, the following steps may occur:
Flash copy establish issued where the target is a GM primary
Stop sync
Bring GM to the idle state
If a consistency group is in progress, it will be failed
New CG formations will be held off until the flash copy command completes
Execute the flash copy command
Start sync
Re-enable CG formation
The next CG cannot form until the flash copy data represented in the OOS bitmap has been drained When a flash copy establish operation is received, GM CG formation will be stopped for the flash copy target volume. This may be done by setting a new "failure flag" in both the logical storage and device level structure for the GM primary volume. Multiple establish commands can be supported in parallel to the same volume (e.g. data set). In this case a counter will be implemented on each volume which will describe how many flash copy establish operations are currently active. If establish operations come in on different volumes in the same logical storage, a flag (or counter) is simply set for each volume in the logical storage, only one logical storage flag is required. Setting this flag is a synchronous process and as soon as the flag is set flash copy may process the establish (including setting the OOS bitmap for the volume). The global mirror will detect that the logical storage level flag is set as part of normal CG formation processing, and once detecting that an establish operation has occurred, the global mirror will fail the current CG attempt.

This may include merging the change recording bitmap into the OOS bitmap. The flash copy may set the OOS bitmap before the CG is failed or during the CR/OOS merge, which does not cause issues as long as proper bitmap locking and CG failure detection are performed. The advantage of this design is that the FLC does not have to wait for the CG to finish failing before proceeding with the establish operation.

Once the flash copy command is complete, the flash copy will call another function to reset the failure flag for the target device (and possibly decrease the counter if multiple FLCs per device are supported—if the counter goes down to zero, then the device level flag is reset. This will allow CGs to form again if no other failure flags are set for this volume or other volumes in the session.

System and Method for FlashCopy Withdraw with any Global Mirror State

Once a FlashCopy (FLC) onto Global Mirror (GM) is allowed, one or more entities may wish to withdraw the FLC while Global Mirror continues run. Withdrawing a Flash-Copy that is part of a currently draining consistency group (CG) would break consistency. Failing the CG and withdrawing the FLC while GM is idle may have negative consequences for a recovery point objective (RPO) of a system. A method to handle FLC withdraw while GM is in any state, without software changes, would be beneficial.

In one embodiment, FLC withdraws are handled in different ways depending on the GM state via the use of flags and a pending FLC state.

One exemplary FLC withdraw algorithm is as follows:
A FLC withdraw is received from software
If the GM is Idle:
    An "Idle Withdraw" flag is set indicating that FLC withdraws are active for a device
        This prevents GM from beginning a new CG formation
The FLC is withdrawn
The "Idle Withdraw" flag is reset on a target device
    If no devices in the session have "Idle Withdraw" or "CGIP Withdraw" flags then GM can try to form a CG
If the GM is COP:
    Set a "Callback FLC" flag indicating that when the current CG finishes, FLC is called back to complete the withdraw operation
    Move the FLC relationship into a withdraw pending state
    The CG is completed
        CG formation may be successful or may fail
    The "CGIP Withdraw" flag is set for each device that has the "Callback FLC" flag set
    A TCB is allocated, the FLC is called back for each device that has the "Callback FLC" flag set
    The FLC is withdrawn for all devices
    The "CGIP Withdraw" flag is reset A sample chain of events may be:
1. GM COP
2. FLC Withdraw issued for device 1000—set Withdraw Pending
3. CG finishes
4 FLC Withdraw issued for device 1001—device withdrawn
5. GM calls back FLC for 1000
6. 1000 withdrawn 7. FLC calls back GM for 1001
8. FLC calls back GM for 1000
9. GM begins next CG formation Using this design, the GM may handle a variety of FLC withdraws when in any state, maintain consistency, and give the FLC a window for withdrawing the FLC.

In one embodiment, the global mirror (GM) may constantly attempt to form consistency groups (CGs). If the logical storage level failure flag is set, then a GM will check each device. If any device level flag is set, the GM will leave the storage level flag set and will not try and form a CG. If no device level flags are set, the GM will reset the logical storage level flag and allow the logical storage to proceed with CG formation.

The flash copy (FLC) will then be included in the next CG at the remote site, once all data set in the out of sync (OOS) by the FLC has been sent for replication and the journals have been reflashed.

In one embodiment, a method for providing a point-in-time copy process in a remote copy process having consistency groups includes forcing the remote copy process to an idle state, failing any consistency group formation in progress; holding new consistency group formation; executing a point-in-time copy process; and when the point-in-time copy process completes, re-enable consistency group formation.

In one embodiment, the forcing step comprises setting a "failure" flag for the remote copy primary volume, which flag is sensed at consistency group formation and which fails any consistency group formation in progress. In another embodiment, the consistency group formation process senses any "failure" flag at the beginning of any consistency group formation attempt, holding new consistency group formation, and forming a gap for the point-in-time copy process. In yet another embodiment, failing a consistency group formation additionally comprises merging the change recording bit map into the OOS bitmap.

In one embodiment, a method for providing withdrawal of a point-in-time copy process in a remote copy process having consistency groups includes (i) if the remote copy process is in an idle state, with no consistency group formation in progress, withdrawing the point-in-time copy; and (ii) else, if a consistency group is in process, allowing the current consistency group to complete, and calling back the point-in-time copy for each device having a copy.

In another embodiment, if the remote copy process is in an idle state, the remote copy process is prevented from beginning a new consistency group formation until the point-in-time copy is withdrawn.

In yet another embodiment, if a consistency group is in process, (i) the point-in-time copy process may be moved to a withdraw pending state, allowing the current consistency group to complete, (ii) a TCB may be allocated to call back a point-in-time copy for each device having a copy, and (iii) subsequent to withdrawal of the point-in-time copy from each device having a copy, the withdraw pending state may be reset.

The present invention may be a system, a method, and/or a computer program product at any possible technical detail level of integration. The computer program product may include a computer readable storage medium (or media) having computer readable program instructions thereon for causing a processor to carry out embodiments of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform embodiments of the present invention.

Embodiments of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement embodiments of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
   receiving a first request to perform a point-in-time snapshot copy operation from a first logical storage volume to a second logical storage volume by a data consistency application, where the data consistency application maintains data consistency by performing asynchronous data replication between the first logical storage volume and the second logical storage volume by forming a consistency group while the data consistency application is set in an active state;
   receiving a second request to withdraw the point-in-time snapshot copy operation being implemented by the data consistency application;
   in response to determining that the data consistency application is creating a current consistency group while the data consistency application is set in an active state, maintaining the second request while allowing the creation of the current consistency group by the data consistency application,
   wherein a callback flag is set upon determining that the data consistency application is creating the current consistency group,
   wherein the callback flag indicates that the withdrawal is to be performed after the creation and replication of the current consistency group,
   wherein the callback flag includes a withdraw pending flag that includes a sub-volume indicator,
   wherein the sub-volume indicator indicates a range of tracks that are to be withdrawn; and
   in response to determining that the data consistency application is set in an idle state, preventing a formation of a new consistency group by the data consistency application during withdrawal of the point-in-time snapshot copy operation.

2. The computer-implemented method of claim 1, wherein the point-in-time snapshot copy operation includes a transfer of a point-in-time copy of data from the first logical storage volume to the second logical storage volume within a system.

3. The computer-implemented method of claim 1, wherein the data consistency application is currently implementing the point-in-time snapshot copy operation when the second request is received.

4. The computer-implemented method of claim 1, wherein the data consistency application is determined to be idle in response to determining that the data consistency application is not currently creating or replicating a consistency group when the second request is received.

5. The computer-implemented method of claim 1, wherein the formation of a new consistency group is prevented by setting an idle flag that indicates that the data consistency application cannot create a new consistency group while the idle flag is set.

6. The computer-implemented method of claim 1, wherein a Consistency Group In Progress (CGIP) flag is reset in response to determining that (i) the data consistency application was creating a current consistency group when second request was received, and (ii) the data consistency application has completed the creation and replication of a current consistency group.

7. The computer-implemented method of claim 6, wherein a callback flag is reset in response to resetting the CGIP flag.

8. The computer-implemented method of claim 1, wherein the point-in-time snapshot copy operation is withdrawn while an idle flag or a Consistency Group In Progress (CGIP) flag is set.

9. The computer-implemented method of claim 1, wherein formation of a new consistency group is enabled after the withdrawal of the point-in-time snapshot copy operation.

10. The computer-implemented method of claim 1, comprising:
in response to identifying data to be transferred as part of the point-in-time snapshot copy operation within the data consistency application, setting the data consistency application in an idle state in which the data consistency application does not form the consistency group; and
marking the identified data while the data consistency application is set in the idle state.

11. The computer-implemented method of claim 1, comprising: causing the point-in-time snapshot copy operation to be withdrawn by issuing a call back for every created point-in-time snapshot copy created during the point-in-time snapshot copy operation.

12. A computer program product comprising one or more computer readable storage media, and program instructions collectively stored on the one or more computer readable storage media, the program instructions comprising instructions configured to cause one or more processors to perform a method comprising:
receiving, by the one or more processors, a first request to perform a point-in-time snapshot copy operation from a first logical storage volume to a second logical storage volume by a data consistency application, where the data consistency application maintains data consistency by performing asynchronous data replication between the first logical storage volume and the second logical storage volume by forming a consistency group while the data consistency application is set in an active state;
marking, by the one or more processors, data to be transferred within the first logical storage volume to the second logical storage volume as part of the point-in-time snapshot copy operation while the data consistency application is set in an idle state;
receiving, by the one or more processors, a second request to withdraw the point-in-time snapshot copy operation being implemented by the data consistency application;
in response to determining that the data consistency application is creating a current consistency group, maintaining, by the one or more processors, the second request while allowing the creation of the current consistency group by the data consistency application, and setting a callback flag,
wherein the callback flag includes a withdraw pending flag that includes a sub-volume indicator,
wherein the sub-volume indicator indicates a range of tracks that are to be withdrawn; and
in response to determining that the data consistency application is set in an idle state, preventing, by the one or more processors, a formation of a new consistency group by the data consistency application during withdrawal of the point-in-time snapshot copy operation, and removing the marked data from the first logical storage volume while the data consistency application is set in the idle state.

13. The computer program product of claim 12, wherein the point-in-time snapshot copy operation includes a transfer of a point-in-time copy of data from the first logical storage volume to the second logical storage volume within a system.

14. The computer program product of claim 12, wherein the data consistency application is currently implementing the point-in-time snapshot copy operation when the second request is received.

15. The computer program product of claim 12, wherein the callback flag indicates that the second request is pending during the creation of the current consistency group.

16. The computer program product of claim 12, wherein the data consistency application is determined to be idle in response to determining that the data consistency application is not currently creating or replicating a consistency group when the second request is received.

17. The computer program product of claim 12, wherein a Consistency Group In Progress (CGIP) flag is reset in response to determining that (i) the data consistency application was creating a current consistency group when the second request was received, and (ii) the data consistency application has completed the creation and replication of a current consistency group.

18. The computer program product of claim 12, wherein the point-in-time snapshot copy operation is withdrawn while an idle flag or a Consistency Group In Progress (CGIP) flag is set, wherein the formation of a new consistency group is prevented by setting an idle flag that indicates that the data consistency application cannot create a new consistency group while the idle flag is set, wherein the idle flag is set in response to a determination that the data consistency application was set in the idle state when the second request to withdraw the point-in-time snapshot copy operation was received.

19. A system, comprising: a processor; and
logic integrated with the processor, executable by the processor, or integrated with and executable by the processor, the logic being configured to:
receive a first request to perform a point-in-time snapshot copy operation from a first logical storage volume to a second logical storage volume by a data consistency application, where the data consistency application maintains data consistency by performing asynchronous data replication between the first logical storage volume and the second logical storage volume by forming a consistency group while the data consistency application is set in an active state;

in response to identifying data to be transferred as part of the point-in-time snapshot copy operation within the data consistency application:
  set the data consistency application in an idle state in which the data consistency application does not form the consistency group,
  mark the data to be transferred within the first logical storage volume as part of the point-in-time snapshot copy operation while the data consistency application is in the idle state,
  restart the data consistency application,
  identify, by the data consistency application, the marked data within the first logical storage volume, and
  create, by the data consistency application, the consistency group including the marked data;

receive a second request to withdraw the point-in-time snapshot copy operation being implemented by the data consistency application;

in response to determining that the data consistency application is creating the consistency group, maintain the second request while allowing the creation of the consistency group by the data consistency application, wherein a callback flag is set upon determining that the data consistency application is creating the consistency group, wherein the callback flag indicates that the withdrawal is to be performed after the creation and replication of the consistency group, wherein the callback flag includes a withdraw pending flag that includes a sub-volume indicator, wherein the sub-volume indicator indicates a range of tracks that are to be withdrawn; and in response to determining that the data consistency application is set in an idle state, prevent a formation of a new consistency group by the data consistency application during withdrawal of the point-in-time snapshot copy operation, and remove the marked data from the first logical storage volume while the data consistency application is set in the idle state.

* * * * *